(12) United States Patent
Weimer et al.

(10) Patent No.: US 12,478,058 B2
(45) Date of Patent: Nov. 25, 2025

(54) METHOD AND DEVICE FOR APPLYING A SPRAY AGENT TO AN AGRICULTURAL LAND

(71) Applicant: Robert Bosch GmbH, Stuttgart (DE)

(72) Inventors: Andreas Weimer, Gaertringen (DE); Carl-Ludwig von Horstig, Heuchelheim (DE); Christoph Schaefer, Bad Laasphe (DE); Farid Khani, Boennigheim (DE); Nicolas Houis, Bietigheim-Bissingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 362 days.

(21) Appl. No.: 18/246,557

(22) PCT Filed: Nov. 8, 2021

(86) PCT No.: PCT/EP2021/080921
§ 371 (c)(1),
(2) Date: Mar. 24, 2023

(87) PCT Pub. No.: WO2022/128254
PCT Pub. Date: Jun. 23, 2022

(65) Prior Publication Data
US 2023/0363371 A1    Nov. 16, 2023

(30) Foreign Application Priority Data

Dec. 15, 2020 (DE) ............ 10 2020 215 878.9

(51) Int. Cl.
*A01M 7/00* (2006.01)
(52) U.S. Cl.
CPC ............... *A01M 7/0089* (2013.01)
(58) Field of Classification Search
None
See application file for complete search history.

(56) References Cited

U.S. PATENT DOCUMENTS

2004/0136139 A1\* 7/2004 Kummel ............ A01M 7/0089
361/226
2021/0016309 A1\* 1/2021 Bremer ................ H04Q 9/00
(Continued)

FOREIGN PATENT DOCUMENTS

DE    102017126223 A1    5/2019
DE    102018203758 A1    9/2019
(Continued)

OTHER PUBLICATIONS

International Search Report for PCT/EP2021/080921, Issued Mar. 2, 2022.

*Primary Examiner* — Helen Zong
(74) *Attorney, Agent, or Firm* — NORTON ROSE FULBRIGHT US LLP (57) ABSTRACT

A method for applying a spray agent to an agricultural land using a spray nozzle unit of an agricultural spray device. The method includes detecting first and second field sections of the agricultural land using an optical detection unit to obtain first and second pieces of image information from the first and second field sections, wherein the pieces of image information have a common lateral overlapping area having a depth in the travel direction of the agricultural spray device; classifying plants in the obtained pieces of image information using a control unit; determining first and second plant identification numbers for first and second image evaluation areas in the obtained first and second pieces of image information using the classified plants; and applying the spray agent as a function of the determined plant identification numbers using the spray nozzle unit of the agricultural spray device.

16 Claims, 5 Drawing Sheets

(56) References Cited

U.S. PATENT DOCUMENTS

2021/0321603 A1* 10/2021 Luck .................. B05B 12/1418
2023/0264207 A1*  8/2023 Giles .................... B05B 15/525
                                                      239/11

FOREIGN PATENT DOCUMENTS

DE      102018217742 A1    4/2020
DE      102018222428 A1    6/2020
WO        2020169817 A1    8/2020

* cited by examiner

METHOD AND DEVICE FOR APPLYING A SPRAY AGENT TO AN AGRICULTURAL LAND

FIELD

The present invention relates to a method for applying a spray agent to an agricultural land using at least one spray nozzle unit of an agricultural spray device, as well as an arrangement with at least a first and a second optical detection unit and an agricultural spray device for applying a spray agent.

BACKGROUND INFORMATION

Algorithms for the detection of plant rows are available. In most cases, the basis for this are camera recordings taken from a field machine. These recordings are taken at sharp inclination angles and show as large an image section as possible to simplify the detection of plant rows as much as possible.

Further, methods for weed detection and classification are available, which are carried out using high resolution small images and preferably without inclination angles to obtain sufficient image resolution for the detection of small plant objects. Here, incorrect classification of crop plant parts may occur, if crop plants or a crop plant row are cut by the edge of the view field, since these parts are most often classified by definition as weeds.

SUMMARY

The present invention provides a method for applying a spray agent to an agricultural land using at least one spray nozzle unit of an agricultural spray device. According to an example embodiment of the present invention, the method includes the following steps:

- detecting a first field section of the agricultural land and a second field section of the agricultural land arranged transversely to a travel direction of the agricultural spray device adjacent to the first field section, using at least one optical detection unit, to obtain a first piece of image information from the first field section and a second piece of image information from the second field section, wherein the pieces of image information have a common lateral overlapping area having a depth T(overlap) in the travel direction of the agricultural spray device;
- classifying plants in the obtained pieces of image information using the control unit;
- determining a first plant identification number for a first image evaluation area in the obtained first piece of image information and a second plant identification number for a second image evaluation area in the obtained second piece of image information, using the classified plants in the image evaluation areas by means of the control unit, wherein the image evaluation areas in the lateral overlapping area are abutting one another and have a depth T(evaluation) in the travel direction of the agricultural spray device, which is less than or equal to the depth of the overlapping area T(overlap); and
- applying the spray agent depending on the determined at least one plant identification number using the spray nozzle unit of the agricultural spray device.

Further, the present invention provides an arrangement. According to an example embodiment of the present invention, the arrangement has at least one first and second optical detection unit, in particular, wherein an optical axis of the optical detection units has an inclination angle greater than 0° relative to the vertical in the travel direction of a spray device, wherein the first optical detection unit is configured to capture a first field section of the agricultural land, and the second optical detection unit is configured to capture a second field section of the agricultural land arranged transversely to the travel direction of the agricultural spray device adjacent to the first field section, in order to obtain a first piece of image information from the first field section and a second piece of image information from the second field section, wherein the optical detection units are arranged such that the pieces of image information have a common lateral overlapping area having a depth T(overlap) in the travel direction of the agricultural spray device, such that defined image evaluation areas in the obtained pieces of image information abut one another in the lateral overlapping area and have a depth T(evaluation) in the travel direction of the agricultural spray device, which is less than or equal to the depth of the overlapping area T(overlap).

The present invention also provides an agricultural spray device for applying a spray agent onto an agricultural land with at least one spray nozzle unit and an arrangement described above.

Finally, the present invention provides a computer program configured to execute the steps of a method described above, if the computer program is executed on a computer, and a machine-readable storage medium having the computer program saved thereon.

The method is intended for, but not limited to, agricultural purposes. An agricultural purpose in the context of the present invention may be understood to mean a purpose directed to economic cultivation of agricultural crops.

Here, the application of the spray agent is performed on an agricultural land or an agriculturally used land. This may be understood to mean a field or a cultivated area plants, or also a land parcel of such a cultivated area. The agricultural land may thus be an arable land, a grassland or a pasture. For example, the plants may include useful plants, the fruit of which is agriculturally used (for example, as food, feed, or energy plants) as well as weeds and grass weeds.

Preferably, all steps of the method are carried out during a movement, in particular a drive or flight of the agricultural spray device over the agricultural land. Thus, in the context of the present application, depending on the design of the spray device, the term "travel direction" may also be understood to mean a "flying direction".

Advantageously, the agricultural spray device according to the present invention is configured to carry out the method in automated and/or autonomous fashion to enable a quick, reliable, and efficient treatment of a field.

According to an example embodiment of the present invention, the agricultural spray device may in particular be part of an agricultural field sprayer or plant protection equipment, or may be configured as an agricultural field sprayer or plant protection equipment. The agricultural spray device may comprise a mobile unit or may be arranged on a mobile unit, wherein the mobile unit, in particular, may be configured as a land vehicle and/or an aircraft and/or a trailer. The mobile unit may in particular be an agricultural work machine, for example a towing vehicle, a tractor, a self-driving or autonomous field sprayer, or a self-driving or autonomous robot. The agricultural spray device may in particular be a towed field sprayer, a self-driving field sprayer, or an attachment field sprayer. The agricultural spray device may also be attached to a hydraulic device of an agricultural work machine. It is also contemplated that the agricultural spray device is mounted on a loading area of an agricultural work machine. Alternatively, the spray device may be hitched to the agricultural work machine. The agricultural spray device or field sprayer may have at least one spray tank for accommodating the spray agent. The agricultural spray device or the field sprayer may also have a mixing unit, which mixes a spray concentrate with water directly on the agricultural spray device to form the spray agent to be applied.

According to an example embodiment of the present invention, the spray agent is in particular a spray liquid. The spray agent may be an agricultural preparation or plant protection product (PPP), in particular a plant protection product concentrate. The spray agent may accordingly include a pesticide, such as herbicide, fungicide, or an insecticide. However, the spray agent may also include or be a fertilizer, in particular a fertilizer concentrate. The spray agent may include a growth regulator in this case. The spray agent may include a granular active agent which has been mixed with a carrier liquid. For example, the spray liquid may be configured as: liquid, suspension, emulsion, solution or a combination thereof. The spray liquid is preferably formed as a water-diluted plant protection product or a water-diluted fertilizer. Accordingly, the spray liquid may be, for example, a spray mixture.

The application of the spray agent may in particular be carried out using a conveyor unit. In this case, the conveyor unit may be configured to convey or conduct, in particular to meter out a liquid and/or a granulate material under pressure. Accordingly, the conveyor unit may comprise, for example, respectively one or multiple pumps, conveyor pumps, metering pumps, pressure tanks, screw conveyors, valves, orifices, etc. The spray nozzle unit preferably has at least one spray nozzle for applying the spray agent and at least one valve for controlling or regulating the amount of spray agent applied. Accordingly, the spray nozzle unit is controllable or actuatable. The valve may be arranged or integrated in the spray nozzle. However, the valve may also be located upstream (in the direction of flow of the spray agent) of the spray nozzle. However, the spray nozzle unit may also have several spray nozzles each having an upstream valve. The spray nozzle unit may also further have several spray nozzles having only one valve upstream of the spray nozzles, such that when the valve is actuated, the spray agent is applied using all the spray nozzles of the spray nozzle unit. The valve may be configured as a pulse width modulated (PWM) valve or a proportional valve. The spray nozzle unit may be configured as a partial width of a nozzle system of the agricultural spray device. The spray nozzle units may be controlled individually or separately and/or in defined groups or associations and/or all jointly. The spray nozzles of each spray nozzle unit may be controlled individually or separately and/or in defined groups or associations and/or all jointly.

One or multiple spray nozzle unit(s) or spray nozzle(s) of a spray nozzle unit may be assigned to each field section row (=field sections along the movement or travel direction). For example, exactly one spray nozzle unit or spray nozzle of a spray nozzle unit or exactly two spray nozzle units or spray nozzles of a spray nozzle unit may be assigned to each field section row in order to treat the latter.

The optical detection unit is preferably arranged on the agricultural spray device. The optical detection unit may comprise at least one multispectral and/or hyperspectral and/or infrared camera and/or 3D-camera. The optical detection unit may be configured to detect or record images in the NIR and/or visual area. The optical detection unit may have a light or lighting unit. The optical detection units may be configured to communicate with one another. Preferably, however, the optical detection units are configured such that they are not in communication with one another. An optical detection unit can be assigned to each field section row. However, it is also possible that an optical detection unit captures two or multiple field section rows. Preferably, an optical axis of at least one optical detection unit has an inclination angle greater than 0° relative to the vertical in the travel direction of the spray device. That is, in other words, the optical detection unit is inclined forward in the travel direction.

Preferably, according to an example embodiment of the present invention, the spray nozzle unit or the spray nozzle units and the optical detection unit or the optical detection units are arranged on a sprayer boom of the agricultural spray device.

According to an example embodiment of the present invention, the step of detecting the field sections may occur, for example, while the agricultural spray device with the optical detection units is traveling over the field. In the process, naturally, the field sections are detected substantially simultaneously by the optical detection units.

The method or the steps of the method are understandably carried out repeatedly. In the process, the steps of detecting the field sections are preferably carried out or repeatedly carried out at a defined time interval, one that is in particular fixed adapted to the speed of the agricultural spray device. That is to say, in other words, that the field sections are detected at a defined or a speed-dependent frame rate or frame frequency (=repeat rate).

According to an example embodiment of the present invention, a detected field section may be a detection section or a detected image section of an optical detection unit. Preferably, the detected field section is the entire field section detected in the field of view of the optical detection unit.

The pieces of image information represent a respective detected field section. The pieces of image information are preferably an image of the respectively detected field section. Preferably, the pieces of image information have a rear image edge having a width B(image,h) and an equally dimensioned or larger front image edge having a width B(image,v) in the travel direction, respectively. As the field sections are preferably detected at an inclination angle of an optical axis of the optical detection unit of greater than 0° relative to the vertical in the travel direction of the spray device, the front image edges consequently have a greater front width B(image,v) than the rear width B(image,h).

Preferably, according to an example embodiment of the present invention, the optical detection units are arranged such that end points of the rear image edges, facing one another, are congruent. Further, the optical detection units are preferably arranged such that the front and rear image edges of the pieces of image information are respectively aligned with one another. Accordingly, the optical detection units are preferably arranged such that their optical axes run along a common plane transverse to the travel direction. Consequently, preferably, the pieces of image information have the same depth T(image) in the travel direction of the spray device.

Furthermore, the optical detection units are arranged such that the pieces of image information have a common lateral overlapping area having a depth T(overlap) in the travel direction of the agricultural spray device. Here, the depth T(overlap) of the lateral overlapping area is less than or equal to the depth T(image) of the pieces of image information. The lateral overlapping area is preferably triangular.

In the pieces of image information, plants are identified and classified. According to an example embodiment of the present invention, the step of identifying plants may comprise detecting a color fraction, in particular a green color fraction and/or an infrared fraction in the field section/field evaluation area or image section/image evaluation area. Here, plants may be detected using the optical detection unit, e.g., on the basis of a predetermined NDVI (normalized difference vegetation index, which is formed from reflection values in the near infrared and visible red wavelength range of the light spectrum) by distinguishing biomass or vital plants and plant parts from the soil. In the step of classification, the plants may be assigned two classes, for example. The first class may be "crop plants" and the second class may be "weeds."

In the step of determination, a first plant identification number is determined for a first image evaluation area in the obtained first image piece of information and a second plant identification number for a second image evaluation area in the obtained second piece of image information, using the classified plants in the image evaluation areas. Here, the image evaluation areas are configured so as to abut one another in the lateral overlapping area and have a depth T(evaluation) in the travel direction of the agricultural spray device, which is less than or equal to the depth of the overlapping area T(overlap). Preferably, the image evaluation areas in the travel direction each have a rear evaluation edge having a width B(evaluation,h) and a equally sized front evaluation edge having a width B(evaluation,v). The width B(evaluation) of the image evaluation areas may be predefined or manually selectable in this case. However, the width B(evaluation) of the image evaluation areas can also be variably selectable or adjustable via the control unit, so that interferences may be compensated for and the abutting arrangement of the image evaluation areas with respect to one another may be ensured. The front and rear evaluation edges of the image evaluation areas are here preferably aligned with one another. The front evaluation edges of the image evaluation areas may be further aligned with the front image edges of the pieces of image information. Preferably, a common lateral edge of the image evaluation areas is arranged transversely to the travel direction centrally in the lateral overlapping area.

It should be noted that further separate image evaluation areas may be provided in the image information without leaving the scope of the present invention. The image evaluation area according to the present invention has a lateral evaluation edge arranged in the lateral overlapping area. In the image information, a further image evaluation area may be provided, which has a lateral evaluation edge in a lateral overlapping area at an opposite lateral image edge of the pieces of image information. Additionally, the image information may have one or more centrally arranged image evaluation areas that do not extend up to a lateral overlapping area. The number of image evaluation areas per piece of image information is dependent on the spray nozzle spacing and the width of the piece of image information. Each image evaluation area is respectively assigned to a spray nozzle. For example, at an image information width of 1.5 m and 25 cm spray nozzle spacing, 6 image evaluation areas per camera would be provided.

Thus, the image evaluation areas are the areas of the pieces of image information, in which the plant identification numbers are determined and evaluated in order to apply the spray agent as a function thereof. The image evaluation areas represent a corresponding field evaluation area of the detected field sections, such that, in the step of applying, the spray agent is preferably applied to the corresponding field evaluation area(s).

In the step of applying, in a positive "spray decision", the spray agent is applied using the spray nozzle unit of the agricultural spray device, depending on the determined plant identification numbers, in particular when reaching and/or falling below and/or exceeding a defined threshold value for the plant identification number. Preferably, the spray agent is applied with a defined minimum amount per surface area. In this case, the spray agent is preferably applied to the entire field evaluation area. The field evaluation areas, on which spray agent is applied with the defined minimum amount per surface area, are also hereinafter referred to as sprayed or treated field evaluation areas.

The plant identification number represents or is preferably a degree of coverage of the corresponding image evaluation area or field evaluation area of plant material and/or an amount of plant material in the respective image evaluation area or field evaluation area and/or the number of identified plants in the respective image evaluation area or field evaluation area. The degree of coverage may be defined via the ratio of the surface area covered by plant material to the total surface area to be evaluated. The degree of coverage for the image evaluation area or field evaluation area is accordingly the ratio of the surface area of the overgrown area to the respective overall image evaluation area. To this end, the number of pixels in the respective image evaluation area, on which plant material is detected, may be determined. Accordingly, using the plant identification number, a measure may be derived for the infestation, depending on which a decision is made as to whether and, if necessary, how (e.g., with what application amount) the corresponding field evaluation area is sprayed or treated.

The threshold value may be a manually entered value, a previously determined value transmitted to the system, or a preset value permanently set on the system. Depending on the crop in the field, the growth stage and the used spray agent or plant protection product, a so-called spray rule may be stored here, i.e., a connection between a specific plant identification number and the decision as to whether and how much plant protection product should be applied. As an example, the rule could be: "If the degree of coverage in the evaluation area exceeds 0.5%, then an application is made on the field evaluation area."

Preferably, a step of identifying plant rows in the pieces of image information using the identified and classified plants in the pieces of image information may be provided, wherein in the step of applying, the spray agent may further be applied as a function of identified plant rows. The step of identifying or detecting plant rows may be carried out continuously or permanently. The step of identifying plant rows is preferably performed using and/or evaluating all or substantially all of the obtained pieces of image information, i.e., over the entire depth T(image).

Advantageously, identifying the plant row may be performed using at least one of the following pieces of information: color fraction, in particular green color fraction of the detected plants, infrared fraction of the detected plants, plant spacing, plant row spacing, growth stage of the plants, geocoordinates of a sowing of the plants. Using these pieces of information or properties, the plant rows may be identified in a simple and reliable way. Since plant rows extend substantially in a straight line, the identification of a plant row may also be performed, for example by fitting a straight line or a straight lined plant rows center line into an image trajectory with the highest green fraction or green value. In the step of identifying, preferably, all plant rows in the detected field section or obtained pieces of image information are identified.

According to an example embodiment of the present invention, the control unit may comprise a computing unit or a plurality of computing units for processing signals or data, at least one storage unit for storing signals or data, at least one communication interface for reading data, in particular for receiving pieces of image information and for outputting data, in particular control signals, to a unit, in particular an actuator. Each optical detection unit may be assigned a computing unit, or each optical detection unit may have its own computing unit. The computing unit is or the computing units are configured or set up for image processing so as to be able to execute computing steps or image processing steps for carrying out the method according to the present invention. Accordingly, each computing unit has a corresponding image processing software. For example, the computing unit may be a signal processor, a microcontroller, or the like, while the storage unit may be a flash memory, an EEPROM, or a magnetic storage unit. The communication interface may be configured to read or output data in a wireless and/or wired manner, wherein a communication interface capable of reading or outputting wired data can, for example, read the data electrically or optically from a corresponding data transmission line or output them into a corresponding data transmission line.

The method according to the present invention method may be implemented, for example, in software or hardware or in a mixed form of software and hardware in the control unit or in a controller.

The control unit may be arranged fully or partially on the agricultural spray device or may be integrated into it. However, the control unit may also be fully or partially externally integrated in a cloud, for example.

The definition of the evaluation areas can either be carried out within a downstream image processing software of the computing unit or, if supported by the optical detection unit or camera, directly as an ROI definition (region of interest) at the level of the imager chip of the optical detection unit or camera.

By the method according to the present invention or the arrangement according to the present invention, due to the advantageous arrangement of the cameras relative to one another and the advantageous configuration of the image evaluation areas in the pieces of image information, the correct allocation of plant parts at the lateral image edge may be improved and thus the accuracy in determining the plant identification number may be increased. This is achieved in particular by the fact that the classification of all identified plants is performed initially in the totality of the pieces of image information, but the determination of the plant identification numbers occurs in the defined image evaluation areas having a small width, wherein these abut one another in such a way that the field may be evaluated in the transverse direction without gaps. Thus, it may still happen that plants cut at the edge of the fields of view or the pieces of image information are misclassified. However, these are not evaluated due to the narrower configuration of the image evaluation areas or are evaluated only to a small extent (if they project into the image evaluation area) for the spray decision.

In comparison to conventional evaluation and classification methods, the optical detection units according to the present invention may be arranged either at the same height closer to one another so that the narrower image evaluation areas abut one another, or may be arranged higher above the ground in order to enlarge the field of view and thus the pieces of image information.

BRIEF DESCRIPTION OF THE DRAWINGS

The present invention will be explained in more detail in the following with reference to the figures.

DETAILED DESCRIPTION OF EXAMPLE EMBODIMENTS

In the following description of preferred embodiment examples of the present invention, identical or similar reference numbers are used for the elements shown and acting similarly in the various figures, a repeated description of these elements being omitted.

Figure 1:
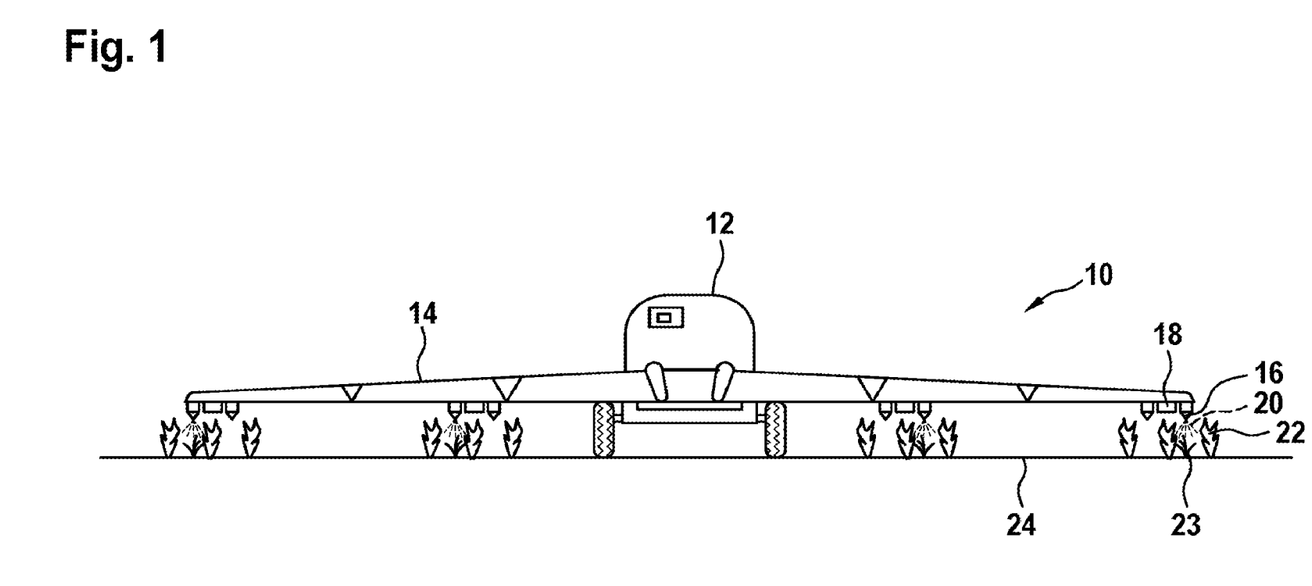
FIG. 1 shows a schematic illustration of an agricultural spray device according to an example embodiment of the present invention.

FIG. 1 shows a schematic illustration of an agricultural spray device, which is provided in its entirety with the reference number 10.

The agricultural spray device 10 is configured as a field sprayer 10. The field sprayer 10 is arranged on a mobile land vehicle 12, which is developed as a towing vehicle 12 or tractor 12.

The agricultural spray device 10 has a spray boom 14. Spray nozzle units 16 and optical detection units 18 are arranged on the spray boom 14. The spray nozzle units 16 are configured to apply a spray agent 20 onto plants 22 or weeds 23 of an agricultural land 24. The optical detection units 18 are configured as optical cameras 18. The optical cameras 18 each comprise a filter unit in order to extract a color fraction, for example the green fraction of an obtained or a detected piece of image information, or of a detected image, in order to detect plants 22 or weeds 23.

The agricultural spray device 10 further has a conveyor unit (not shown), using which the amount of application or the amount of an active agent in the spray agent 20 to be applied can be adjusted or varied.

The agricultural spray device 10 also has control units (not shown) connected to the optical cameras 18 in order to receive information from the latter. The control units have a computing unit, which is configured to carry out calculation steps or image processing steps to execute the method according to the present invention. The control units are further configured to output a control signal such that the spray agent 20 is applied by the associated spray nozzle units 16 depending on the determined plant identification number.

Figure 2:
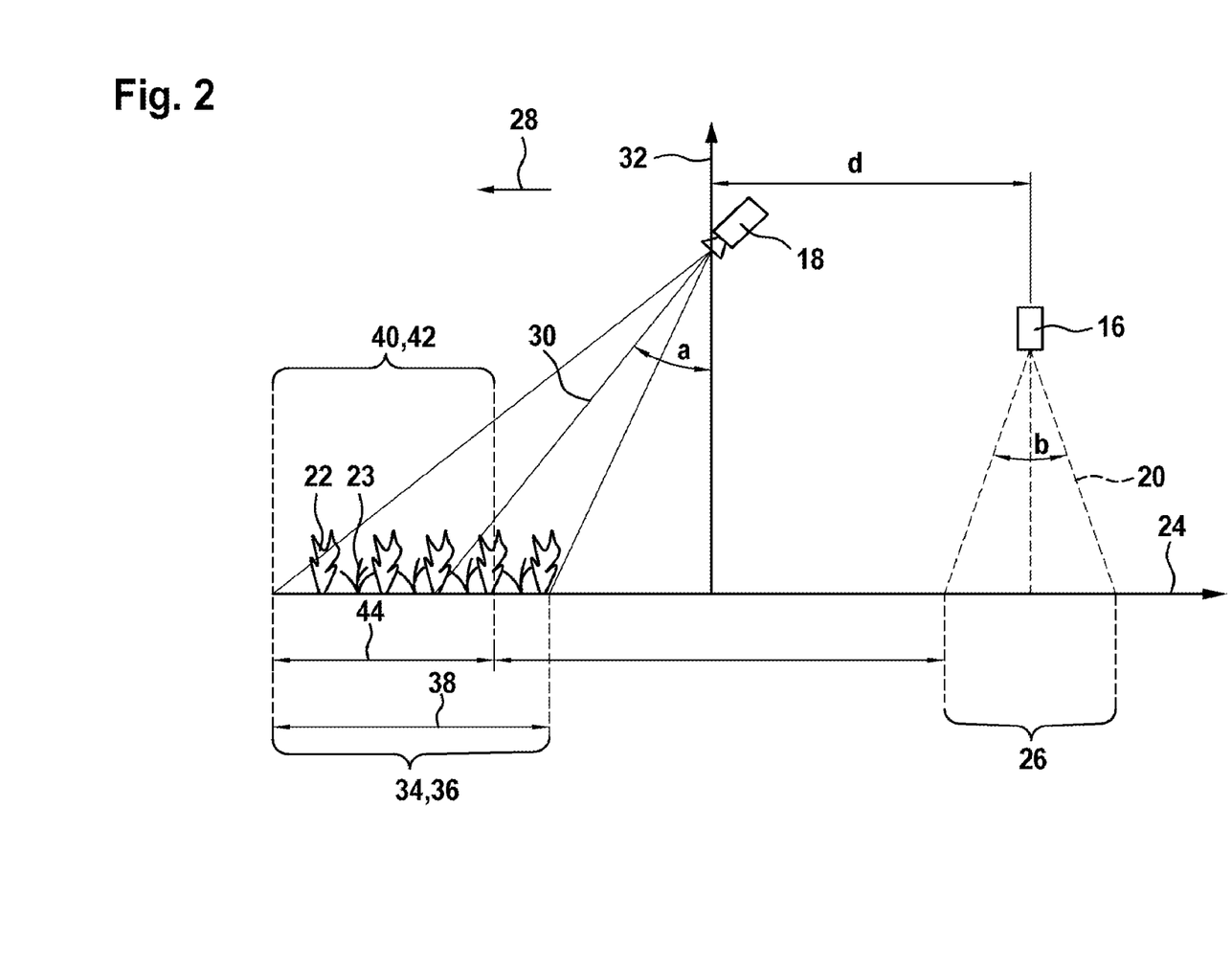
FIG. 2 shows a schematic illustration of a basic geometric arrangement of the optical detection unit and the spray nozzle unit with respect to one another, according to an example embodiment of the present invention.

FIG. 2 shows a basic geometric arrangement of a spray nozzle unit 16, which, in the event of a positive spray decision, applies the spray agent 20 to a spray area 26, and an inclined optical detection unit 18 or camera 18 on the agricultural spray device 10. The inclination angle a is the angle in the travel direction 28 of the spray device 10 between an optical axis 30 of the camera 18 and a vertical 32.

As further seen in FIG. 2, a field section 34 of agricultural land 24 is detected by optical detection unit 18 to obtain a piece of image information 36 from the field section 34 having a depth T(image) 38 in the travel direction 28. Plants 22, 23 are subsequently identified and classified in an image evaluation area 40 of the obtained piece of image information 36, wherein the image evaluation area 40 represents a corresponding field evaluation area 42 of the detected field section 34 with a depth T(evaluation) 44 in the travel direction 28 of the spray device 10. Depending on the determined plant identification number for the image evaluation area 40, the spray agent 20 is then applied in a planar manner to the field evaluation area 42 of the detected field section 34 using the spray nozzle unit 16.

Figure 3:
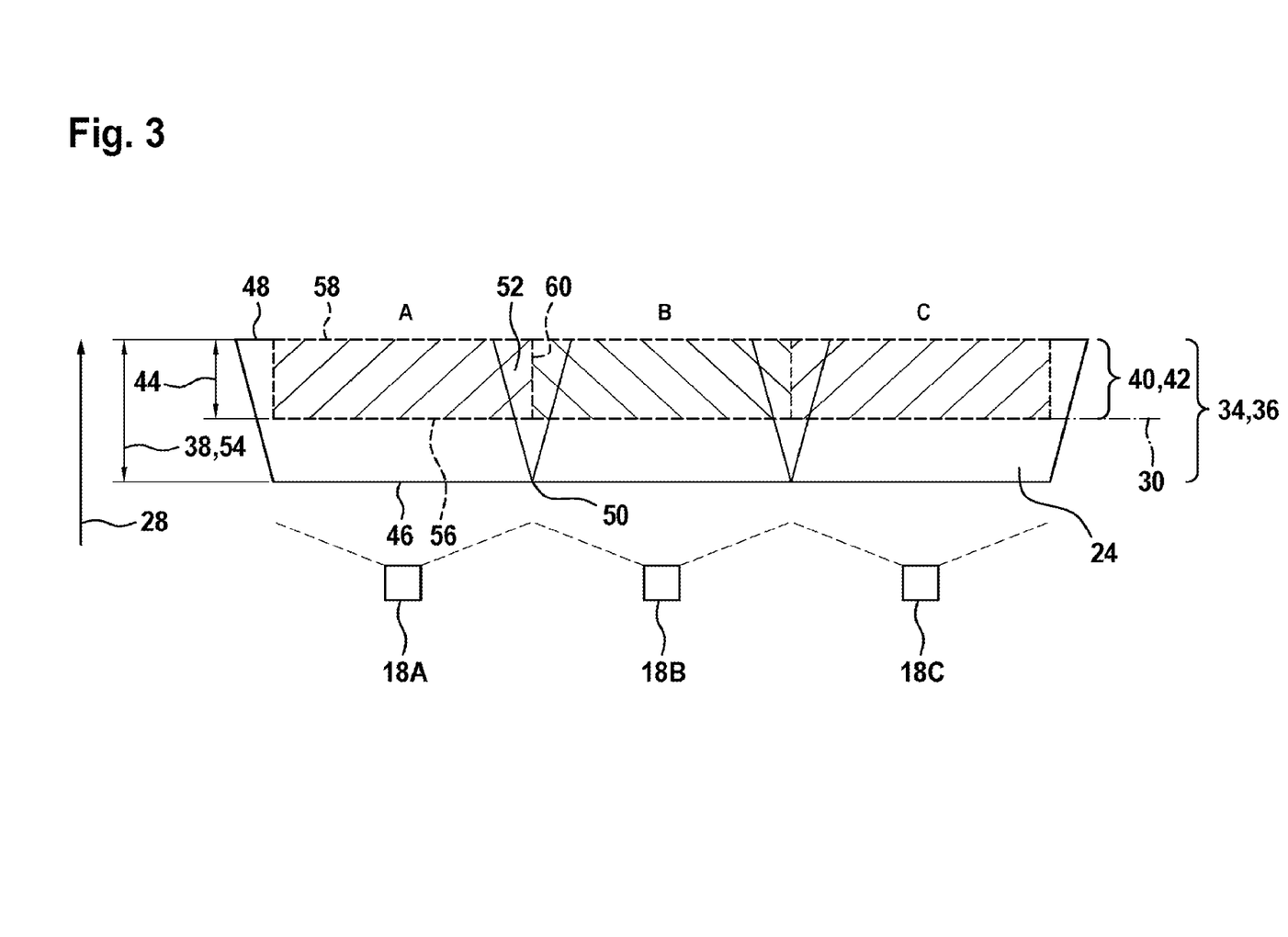
FIG. 3 shows a schematic illustration of an arrangement of optical detection units and pieces of image information, according to an example embodiment of the present invention.

FIG. 3 is a schematic illustration of an arrangement of forwardly inclined optical detection units or cameras 18A, 18B, 18C (18A-C) and the corresponding detected field sections 34A, 34B, 34C (34A-C) or pieces of image information 36A, 36B, 36C (36A-C). The pieces of image information 36A-C are configured to be identical in this case. Due to the inclined cameras 18A-C, the pieces of image information 36A-C in each case have in the travel direction 28 a rear image edge 46 having a width B(image,h) and a larger front image edge 48 having a width B(image,v). The front and rear image edges 46, 48 are respectively aligned with one another. Further, due to the advantageous arrangement of the cameras 18A-C, end points 50 of the rear image edges 46 facing one another are congruent such that a triangular lateral overlapping area 52 results between two pieces of image information 36A-C. The lateral overlapping area 52 has a depth T(overlap) 54 corresponding to the depth T(image) 38 of the pieces of image information 36A-C.

The image evaluation areas 40A, 40B, 40C (40A-C) each have in a travel direction 28 a rear evaluation edge 56 having a width B(evaluation,h) and an equally dimensioned front evaluation edge 58 having a width B(evaluation,v). Here, the front and rear evaluation edges 56, 58 of the image evaluation areas 40A-C are respectively aligned with one another.

As further seen in FIG. 3, the cameras 18A-C are arranged such that the image evaluation areas 40A-C in the lateral overlapping areas 52 abut one another. The image evaluation areas 40A-C here have a depth T(evaluation) 44 in the travel direction 28, which is less than the depth of the overlapping area 52 T(overlap) 54. The image evaluation areas 40A-C further have a common lateral edge 60 arranged transversely to the travel direction 28 centrally within the respective lateral overlapping area 52.

Figure 4:
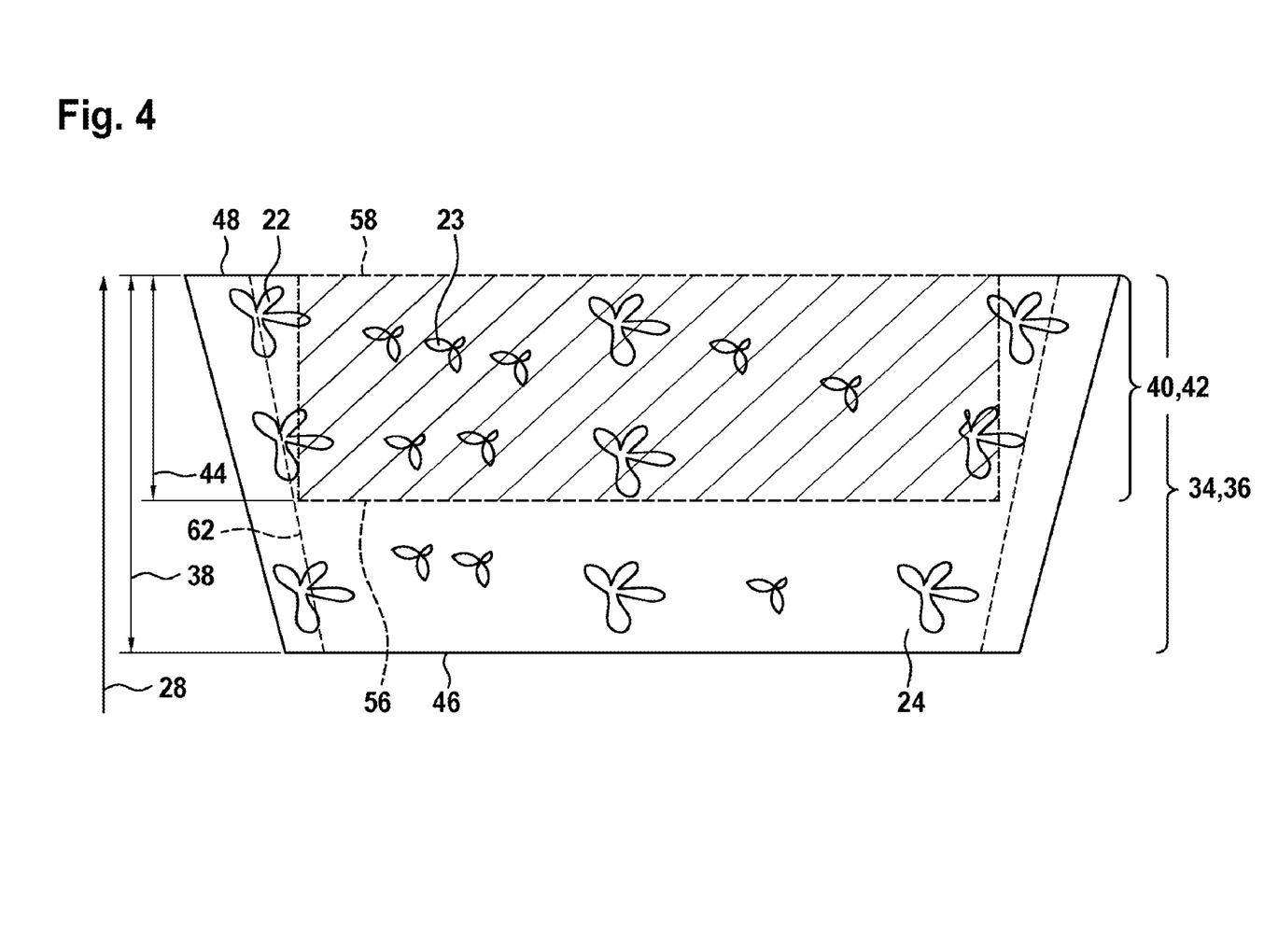
FIG. 4 shows a piece of image information with an image evaluation area, according to an example embodiment of the present invention.

FIG. 4 illustrates an embodiment example, in which plants 22, 23 are classified in the piece of image information 36, wherein plant rows 62 are identified using the classified plants 22 in the entire image information. The determination of the plant identification number for the image evaluation area 40 is subsequently performed using the classified plants 23, wherein spray decision is made based on the plant identification number of the image evaluation area 40.

Figure 5:
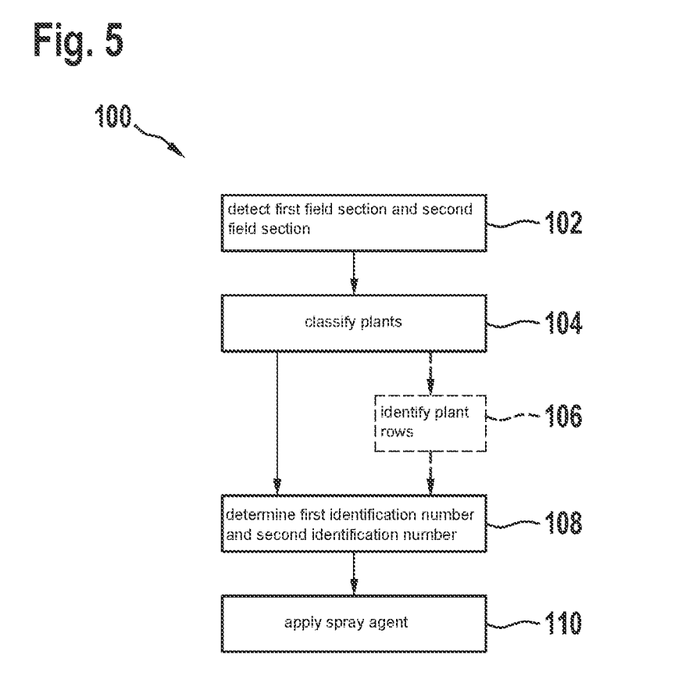
FIG. 5 shows a flow chart of a method according to one embodiment example of the present invention.

FIG. 5 shows a flowchart of a method for applying a spray agent 20 to an agricultural land 24 using at least one spray nozzle unit 16 of an agricultural spray device 10. The method 100 comprises a step of detecting 102 a first field section 34, 34A-C of the agricultural land 24 and a second field section 36, 36A-C of the agricultural land 24 arranged transversely to the travel direction 28 of the agricultural spray device 10 adjacent to the first field section 34, 34A-C, using at least one optical detection unit 18, 18A-C, in order to obtain a first piece of image information 36, 36A-C from the first field section (34, 34A-C) and a second piece of image information 36, 36A-C from the second field section 34, 34A-C, wherein the pieces of image information 36, 36A-C have a common lateral overlapping area 52 having a depth T(overlap) 54 in the travel direction 28 of the agricultural spray device 10. The method 100 further comprises a step of classifying 104 plants 22, 23 in the obtained pieces of image information 36, 36A-C using the control unit. The method 100 also comprises a step of determining 108 a first plant identification number for a first image evaluation area 40, 40A-C in the obtained first piece of image information 36, 36A-C and a second plant identification number for a second image evaluation area 40, 40A-C in the obtained second piece of image information 36, 36A-C, using the classified plants 23 in the image evaluation areas 40, 40A-C by means of the control unit, wherein the image evaluation areas 40, 40A-C in the lateral overlapping area 52 abut one another and have a depth T(evaluation) 44 in the travel direction 28 of the agricultural spray device 10, which is less than or equal to the depth of the overlapping area 52 T(overlap) 54. The method 100 further comprises a step of applying 110 the spray agent 20 as a function of the determined at least one plant identification number using the spray nozzle unit 16 of the agricultural spray device 10.

The method 100 further comprises an optional step of identifying 106 plant rows 62 in the pieces of image information 36, 36A-C using the classified plants 22 in the pieces of image information 36, 36A-C by means of the control unit, wherein, in the step of applying 110, the spray agent 20 is further applied as a function of identified plant rows 62.

If an embodiment example comprises an "and/or" conjunction between a first feature and a second feature, this is to be read such that the embodiment example according to one embodiment has both the first feature and the second feature and according to a further embodiment has either only the first feature or only the second feature.

The invention claimed is:

1. A method for applying a spray agent to an agricultural land using at least one spray nozzle unit of an agricultural spray device, comprising the following steps:

detecting, using at least one optical detection unit, a first field section of the agricultural land, and a second field section of the agricultural land arranged transversely to a travel direction of the agricultural spray device adjacent to the first field section, to obtain a first piece of image information from the first field section and a second piece of image information from the second field section, wherein the first and second pieces of image information have a common lateral overlapping area having a depth in the travel direction of the agricultural spray device;

classifying plants in the obtained first and second pieces of image information using a control unit;

determining a first plant identification number for a first image evaluation area in the obtained first piece of image information, and a second plant identification number for a second image evaluation area in the obtained second piece of image information, using the classified plants in the first and second image evaluation areas using the control unit, wherein the first and second image evaluation areas, in the lateral overlapping area, abut one another and have a depth in the 
travel direction of the agricultural spray device, which is less than or equal to the depth of the overlapping area; and applying the spray agent as a function of the determined first and second plant identification numbers using the spray nozzle unit of the agricultural spray device.

2. The method according to claim 1, wherein each of the first and second pieces of image information in the travel direction have a rear image edge having a width and an equally dimensioned or larger front image edge having a width.

3. The method according to claim 2, wherein the front and rear image edges of the first and second pieces of image information are respectively aligned with one another.

4. The method according to claim 2, wherein the width of each of the rear image edges is greater than the width of each the front image edges, and mutually facing end points of the rear image edges are congruent.

5. The method according to claim 1, wherein the depth of the lateral overlapping area is less than or equal to the depth of the first and second pieces of image information.

6. The method according to claim 1, wherein each of the first and second image evaluation areas in the travel direction has a rear evaluation edge having a width and a equally dimensioned front evaluation edge having a width.

7. The method according to claim 6, wherein the width of each of the first and second image evaluation areas is variably selectable using the control unit in to ensure an abutting arrangement of the first and second image evaluation areas with respect to one another.

8. The method according to claim 6, wherein the front and the rear evaluation edges of the first and second image evaluation areas are respectively aligned with one another.

9. The method according to claim 1, wherein a common lateral edge of the first and second image evaluation areas is arranged transversely to the travel direction centrally in the lateral overlapping area.

10. The method according to claim 1, wherein the first and second image evaluation areas each represent a corresponding field evaluation area of the detected first and second field sections, and in the step of applying, the spray agent is applied to the corresponding field evaluation areas.

11. The method according to claim 1, wherein each of the first and second plant identification numbers represents a degree of coverage of the first and second image evaluation areas, respectively, of plant material and/or an amount of plant material in the first and second image evaluation areas, respectively and/or a number of identified plants in the first and second image evaluation areas, respectively.

12. The method according to claim 1, characterized in that the first and second field sections are detected at an inclination angle of an optical axis of the optical detection unit of greater than 0° relative to a vertical in the travel direction of the spray device.

13. The method according to claim 1, further comprising identifying plant rows in the first and second pieces of image information using the classified plants in the first and second pieces of image information using the control unit, wherein in the step of applying, the spray agent is further applied as a function of the identified plant rows.

14. An arrangement, comprising:

at least one first and second optical detection unit, wherein an optical axis of the first and second optical detection units has an inclination angle greater than 0° relative to vertical in the travel direction of a spray device, wherein the first optical detection unit is configured to capture a first field section of the agricultural land, and the second optical detection unit is configured to capture a second field section of the agricultural land arranged transversely to the travel direction of the agricultural spray device adjacent to the first field section, to obtain a first piece of image information from the first field section and a second piece of image information from the second field section, wherein the first and second optical detection units are arranged such that the first and second pieces of image information have a common lateral overlapping area having a depth in the travel direction of the agricultural spray device, such that defined image evaluation areas in the obtained first and second pieces of image information abut one another in the lateral overlapping area and have a depth in the travel direction of the agricultural spray device, which is less than or equal to the depth of the overlapping area.

15. An agricultural spray device for applying a spray agent to an agricultural land, comprising:

at least one spray nozzle unit; and an arrangement including at least one first and second optical detection unit, wherein an optical axis of the first and second optical detection units has an inclination angle greater than 0° relative to vertical in the travel direction of a spray device, wherein the first optical detection unit is configured to capture a first field section of the agricultural land, and the second optical detection unit is configured to capture a second field section of the agricultural land arranged transversely to the travel direction of the agricultural spray device adjacent to the first field section, to obtain a first piece of image information from the first field section and a second piece of image information from the second field section, wherein the first and second optical detection units are arranged such that the first and second pieces of image information have a common lateral overlapping area having a depth in the travel direction of the agricultural spray device, such that defined image evaluation areas in the obtained first and second pieces of image information abut one another in the lateral overlapping area and have a depth in the travel direction of the agricultural spray device, which is less than or equal to the depth of the overlapping area.

16. A non-transitory machine-readable storage medium on which is stored a computer program for applying a spray agent to an agricultural land using at least one spray nozzle unit of an agricultural spray device, the computer program, when executed by a computer, causing the computer to perform the following steps:

detecting, using at least one optical detection unit, a first field section of the agricultural land, and a second field section of the agricultural land arranged transversely to a travel direction of the agricultural spray device adjacent to the first field section, to obtain a first piece of image information from the first field section and a second piece of image information from the second field section, wherein the first and second pieces of image information have a common lateral overlapping area having a depth in the travel direction of the agricultural spray device;

classifying plants in the obtained first and second pieces of image information using a control unit;

determining a first plant identification number for a first image evaluation area in the obtained first piece of image information, and a second plant identification number for a second image evaluation area in the obtained second piece of image information, using the classified plants in the first and second image evaluation areas using the control unit, wherein the first and second image evaluation areas, in the lateral overlapping area, abut one another and have a depth in the travel direction of the agricultural spray device, which is less than or equal to the depth of the overlapping area; and applying the spray agent as a function of the determined first and second plant identification numbers using the spray nozzle unit of the agricultural spray device.

* * * * *